(12) United States Patent
Guha et al.

(10) Patent No.: US 10,874,994 B2
(45) Date of Patent: Dec. 29, 2020

(54) MEMBRANE SURFACE ACTIVATION TO ELIMINATE FOULING AND CONCENTRATION POLARIZATION IN WATER PURIFICATION SYSTEMS

(71) Applicant: The Penn State Research Foundation, University Park, PA (US)

(72) Inventors: Rajarshi Guha, State College, PA (US); Manish Kumar, State College, PA (US); Darrell Velegol, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 210 days.

(21) Appl. No.: 15/685,216

(22) Filed: Aug. 24, 2017

(65) Prior Publication Data
US 2018/0056248 A1   Mar. 1, 2018

Related U.S. Application Data

(60) Provisional application No. 62/380,723, filed on Aug. 29, 2016.

(51) Int. Cl.
*B01D 69/12* (2006.01)
*B01D 71/02* (2006.01)
(Continued)

(52) U.S. Cl.
CPC .............. *B01D 71/56* (2013.01); *B01D 65/08* (2013.01); *B01D 69/12* (2013.01); *B01D 69/145* (2013.01);
(Continued)

(58) Field of Classification Search
CPC .... B01D 61/025; B01D 61/027; B01D 65/08; B01D 69/145; B01D 69/148;
(Continued)

(56) References Cited

U.S. PATENT DOCUMENTS 3,562,137 A  2/1971  Gehring
8,672,142 B2  3/2014  Nishiyama et al.
(Continued)

FOREIGN PATENT DOCUMENTS

EP  2168667 A1  3/2010
WO  2012158717 A2  11/2012
(Continued)

OTHER PUBLICATIONS

Sasson et al., Environ. Sci. Technol. 2014, 48, 384-393, Surface Functionalization of Thin-Film Composite Membranes with Copper Nanoparticles for Antimicrobial Surface Properties. (Year: 2014).*
(Continued)

*Primary Examiner* — Pranav N Patel
(74) *Attorney, Agent, or Firm* — Cantor Colburn LLP (57) ABSTRACT

Disclosed herein is a membrane comprising a bonding layer; and an activation layer disposed on the bonding layer and in contact with it; where the activation layer comprises catalyst nanoparticles that are operative to decompose impurities contained in an aqueous solution to generate gas bubbles that remove a sludge disposed on the membrane. Disclosed herein too is a method of purifying an aqueous solution comprising disposing in the aqueous solution, a membrane that comprises a bonding layer and an activation layer; where the activation layer comprises catalyst nanoparticles; partitioning the aqueous solution into a concentrate portion and a filtrate portion; where the activation layer contacts the concentrate portion; and decomposing impurities contained
(Continued)

in the aqueous solution to generate gas bubbles that remove a sludge disposed on the membrane.

12 Claims, 4 Drawing Sheets

(51) Int. Cl.

| | |
|---|---|
| B01D 71/56 | (2006.01) |
| B01D 69/14 | (2006.01) |
| C02F 1/44 | (2006.01) |
| B01D 65/08 | (2006.01) |
| C01G 3/02 | (2006.01) |
| C09J 165/00 | (2006.01) |
| C01B 13/14 | (2006.01) |
| C01G 39/06 | (2006.01) |
| C08G 69/10 | (2006.01) |
| B01D 61/02 | (2006.01) |
| C02F 1/72 | (2006.01) |
| C01B 32/182 | (2017.01) |
| C01B 32/158 | (2017.01) |
| B01D 71/68 | (2006.01) |

(52) U.S. Cl.
CPC .............. *C01B 13/14* (2013.01); *C01G 3/02* (2013.01); *C01G 39/06* (2013.01); *C02F 1/44* (2013.01); *C08G 69/10* (2013.01); *C09J 165/00* (2013.01); *B01D 61/025* (2013.01); *B01D 61/027* (2013.01); *B01D 69/148* (2013.01); *B01D 71/021* (2013.01); *B01D 71/022* (2013.01); *B01D 71/024* (2013.01); *B01D 71/68* (2013.01); *C01B 32/158* (2017.08); *C01B 32/182* (2017.08); *C01P 2004/03* (2013.01); *C02F 1/441* (2013.01); *C02F 1/442* (2013.01); *C02F 1/725* (2013.01); *C02F 2303/20* (2013.01); *C02F 2305/023* (2013.01); *C02F 2305/08* (2013.01); *C08G 2261/1422* (2013.01); *C08G 2261/3241* (2013.01)

(58) Field of Classification Search
CPC .. B01D 71/021; B01D 71/022; B01D 71/024; B01D 71/56; B01D 71/68; C01B 13/14; C01B 32/158; C01G 39/06; C01G 3/02; C01P 2004/03; C02F 1/44; C02F 1/441; C02F 1/442; C02F 1/725; C02F 2303/20; C02F 2305/08; C08G 2261/1422; C08G 2261/3241; C08G 69/10; C09J 165/00
See application file for complete search history.

(56) References Cited

U.S. PATENT DOCUMENTS

| | | |
|---|---|---|
| 2010/0059433 A1 | 3/2010 | Freeman et al. |
| 2010/0320143 A1 | 12/2010 | Konishi et al. |
| 2016/0228549 A1 | 8/2016 | Messersmith et al. |

FOREIGN PATENT DOCUMENTS

| | | |
|---|---|---|
| WO | 2013114297 A1 | 8/2013 |
| WO | 2015077674 A1 | 5/2015 |

OTHER PUBLICATIONS

Zhao et al., Journal of Membrane Science 450 (2014) 249-256, Improving the performance of polyamide reverse osmosis membrane by incorporation of modified multi-walled carbon nanotubes. (Year: 2014).*

Bohling et al.; "Repulsive van der Waals Forces Self-Limit Native Oxide Growth"; Langmuir, 31; 2015, pp. 4862-4867.
De Lannoy et al.; "Aquatic Biofouling Prevention by Electrically Charged Nanocomposite Polymer Thin Film Membranes"; Environ. Sci. Technol., 47; 2013, pp. 2760-2768.
Duan et al.; "Electrochemical mineral scale prevention and removal on electrically conducting carbon nanotube—polyamide reverse osmosis membranes"; Environ. Sci.: Processes Impacts, 16; 2014, pp. 1300-1308.
Dudchenko et al.; "Organic fouling inhibition on electrically conducting carbon nanotube-polyvinyl alcohol composite ultrafiltration membranes"; Journal of Membrane Science, 468; 2014, pp. 1-10.
Guha et al.; "Diffusiophoresis contributes significantly to colloidal fouling in low salinity reverse osmosis systems"; Journal of Membrane Science, 479; 2015, pp. 67-76.
Gunawan et al.; "Cytotoxic Origin of Copper(II) Oxide Nanoparticles: Comparative Studies with Micron-Sized Particles, Leachate, and Metal Salts"; ACS Nano, vol. 5, No. 9; 2011, pp. 7214-7225.
International Search Report for International Application No. PCT/US2017/048380; International Filing Date Aug. 24, 2017; dated Dec. 27, 2017, 7 pages.
Jiang et al.; "Antifouling and Antimicrobial Polymer Membranes Based on Bioinspired Polydopamine and Strong Hydrogen-Bonded Poly(N-vinyl pyrrolidone)"; ACS Appl. Mater. Interfaces, 5; 2013, pp. 12895-12904.
Kang et al.; "Development of antifouling reverse osmosis membranes for water treatment: A review"; water research 46; 2012, pp. 584-600.
Kasemset et al.; "Effect of polydopamine deposition conditions on fouling resistance, physical properties,and permeation properties of reverse osmosis membranes in oil/water separation"; Journal of Membrane Science 425-426; 2013, pp. 208-216.
Kim et al.; "Design of TiO2 nanoparticle self-assembled aromatic polyamide thin-film-composite (TFC) membrane as an approach to solve biofouling problem"; Journal of Membrane Science, 211; 2003, pp. 157-165.
Liao et al.; "Insights into the Role of Humic Acid on Pd-catalytic Electro-Fenton Transformation of Toluene in Groundwater"; Scientific Reports, 5; 2015, 7 pages.
Liu et al.; "Bubble-induced acoustic micromixing"; Lab Chip, 2; 2002, pp. 151-157.
Lovely et al.; "Humic substances as electron acceptors for microbial respiration"; Nature, vol. 382; Aug. 1, 1996, pp. 445-448.
McCloskey et al.; "A bioinspired fouling-resistant surface modification for water purification membranes"; Journal of Membrane Science; 413-414; 2012, pp. 82-90.
Ray et al.; "Hydrophilic, Bactericidal Nanoheater-Enabled Reverse Osmosis Membranes to Improve Fouling Resistance"; ACS Appl. Mater. Interfaces, 7; 2015, pp. 11117-11126.
Rodrigues et al.; Quantification of humic acids in surface water: effects of divalent cations, pH, and filtration; J. Environ. Monit., 11; 2009, 377-382.
Singh et al.; "Synthesis of Different Cu(OH)2 and CuO (Nanowires, Rectangles, Seed-, Belt-, and Sheetlike) Nanostructures by Simple Wet Chemical Route"; J. Phys. Chem. C, 113; 2009, pp. 3409-3418.
Tabor et al.; "Repulsive van der Waals Forces in Soft Matter: Why Bubbles Do Not Stick to Walls"; Physical Review Letters, 106; 2011, 4 pages.
Tang et al.; "Polysulfone Membranes Modified with Bioinspired Polydopamine and Silver Nanoparticles Formed in Situ To Mitigate Biofouling"; Environ. Sci. Technol. Lett., 2; 2015, pp. 59-65.
Tragardh; "Membrane Cleaning"; Desalination, 71; 1989, pp. 325-335.
Written Opinion for International Application No. PCT/US2017/048380; International Filing Date Aug. 24, 2017; dated Dec. 27, 2017, 5 pages.
Zhang et al.; "Novel binding procedure of TiO2 nanoparticles to thin film composite membranes via self-polymerized polydopamine"; Journal of Membrane Science, 437; 2013, pp. 179-188.

\* cited by examiner

MEMBRANE SURFACE ACTIVATION TO ELIMINATE FOULING AND CONCENTRATION POLARIZATION IN WATER PURIFICATION SYSTEMS

CROSS-REFERENCE TO RELATED APPLICATIONS

This application is a US Non-Provisional application which claims the benefit of U.S. Provisional Application No. 62/380,723, filed Aug. 29, 2016, the entire contents of which are hereby incorporated by reference.

BACKGROUND

This disclosure relates to membrane surface activation to eliminate fouling in water purification systems. In particular, this disclosure relates to gas generation on the surface of a membrane that facilitates the elimination of fouling on the surface of the membrane and to create two phase flow induced micromixing that substantially reduces concentration polarization.

Fouling is ubiquitous in water purification membrane systems. It represents a particularly intractable challenge in high pressure membrane systems that use reverse osmosis (RO) and nanofiltration (NF). Particulate, organic matter and biofouling are deleterious to membrane systems both in terms of membrane productivity and energy consumption. While flow reversal (backwashing) and the use of chlorination are widely practiced to mitigate fouling in low pressure membrane systems, no specific strategy is in place to efficiently mitigate the different types of fouling continuously without interrupting filtration processes in RO and NF.

Despite large advances in membrane development, the RO/NF processes suffer from performance deterioration of membranes and high energy consumption. Two persistent issues in these membrane systems that increase energy consumption and contribute to increased operational costs are: 1) concentration polarization (CP) where solute builds up on the membrane surface and reduces the driving force for the transport of water, and 2) colloidal particles, organic matter and bacterial deposition on membranes leading to fouling and performance deterioration in these systems.

It is therefore desirable to develop membrane systems for RO/NF processes that can alleviate some of the aforementioned problems that occur during filtration.

SUMMARY

Disclosed herein is a membrane comprising a bonding layer; and an activation layer disposed on the bonding layer and in contact with it; where the activation layer comprises catalyst nanoparticles that are operative to decompose impurities contained in an aqueous solution to generate gas bubbles that remove a sludge disposed on the membrane.

Disclosed herein too is a method of manufacturing a membrane comprising disposing an activation layer upon a surface of a bonding layer; where the activation layer comprises catalyst nanoparticles that are operative to decompose impurities contained in an aqueous solution to generate gas bubbles that remove a sludge disposed on the membrane.

Disclosed herein too is a method of purifying an aqueous solution comprising disposing in the aqueous solution, a membrane that comprises a bonding layer and an activation layer; where the activation layer comprises catalyst nanoparticles; partitioning the aqueous solution into a concentrate portion and a filtrate portion; where the activation layer contacts the concentrate portion; and decomposing impurities contained in the aqueous solution to generate gas bubbles that remove a sludge disposed on the membrane.

DETAILED DESCRIPTION

Disclosed herein is a membrane for use in water purification that enhances the mass transfer of water across the membrane and that reduces concentration polarization during purification. Disclosed herein too is a method for improved water purification using the membrane. The membrane is designed to create two phase flows (e.g., cleaning microbubbles) at the membrane surface through the use of catalytic reactions. The mixing generated by two phase flows (gas in liquid) facilitate the removal and dispersion of impurities that settle on the membrane surface during purification. The intense micromixing on the membrane surface enhances mass transfer across the membrane surface and also reduces concentration polarization.

Figure 1:
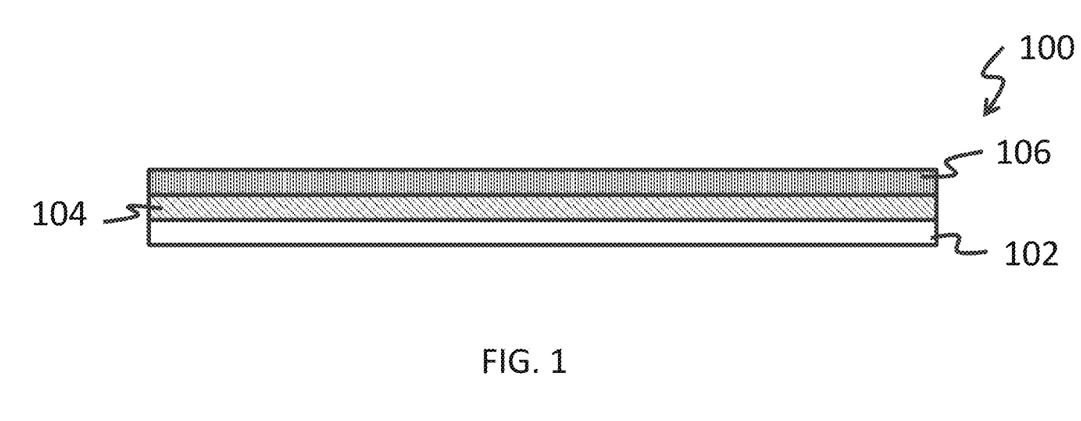
FIG. 1 is a schematic depiction of an exemplary membrane used in water purification.
Figure 2:
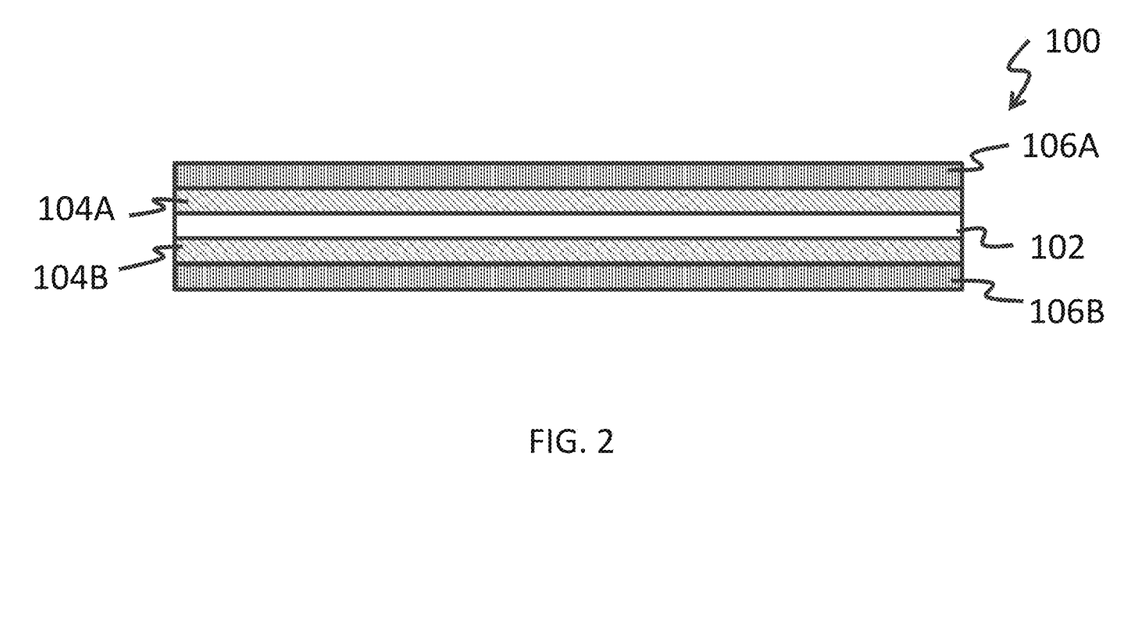
FIG. 2 is another schematic depiction of an exemplary membrane used in water purification.

The FIGS. 1 and 2 depict exemplary embodiments of a membrane 100 that is used for water purification. In the FIG. 1, the membrane 100 comprises a first polymeric layer 102 upon which is disposed a bonding layer 104 and an activation layer 106. The first polymeric layer 102 is in direct contact with the bonding layer 104, which is in direct contact with the activation layer 106. The bonding layer 104 facilitates the attachment of the activation moieties to membrane 100.

In the FIG. 2, the membrane 100 comprises a first polymeric layer 102 upon which is disposed a first bonding layer 104A and a first activation layer 106A. The first polymeric layer 102 is in direct contact with the first bonding layer 104A, which is in direct contact with the first activation layer 106A. Disposed on an opposing surface of the first polymeric layer 102 is a second bonding layer 104B and a second activation layer 106B. The first polymeric layer 102 is also in direct contact with the second bonding layer 104B, which is in direct contact with the second activation layer 106B.

It is desirable for the first polymeric layer 102 to structurally and mechanically support the first and/or the second bonding layer. In an embodiment, it is also desirable for the first polymeric layer 102 to adhesively bond with the first and/or the second bonding layer.

The first polymeric layer 102 in the FIGS. 1 and 2 may comprise an organic polymer. The organic polymer used in the first polymeric layer 102 is capable of providing structural support to the membrane 100 and any fouling matter that gets deposited on the membrane 100 during the course of water purification. The organic polymer should adhere to the bonding layer (e.g., the first and/or second bonding layer) under aqueous conditions and under hydrostatic pressures of 0.2 to 8 MPa.

Suitable organic polymers may be thermoplastic polymers, thermosetting polymers, blends of thermoplastic polymers, blends of thermosetting polymers, and blends of thermoplastic polymers with thermosetting polymers. The organic polymer can be a homopolymer, a copolymer, a block copolymer, an alternating copolymer, an alternating block copolymer, a random copolymer, a random block copolymer, a graft copolymer, a star block copolymer, an ionomer, a dendrimer, a liquid crystalline polymer, or a combination comprising at least one of the foregoing polymers. The organic polymer may be semi-crystalline of amorphous.

Examples of thermoplastic polymers are polyacetals, polyacrylics, polycarbonates polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, polysiloxanes, polyolefins, polyacrylamides, polydopamine, or the like, or a combination comprising at least one of the foregoing organic polymers.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, unsaturated polyesterimides, or the like, or a combination comprising at least one of the foregoing thermosetting polymers. Derivatives of the foregoing thermoplastic or thermosetting polymers may be used in the first polymeric layer 102.

In an exemplary embodiment, the first polymeric layer 102 may comprise a polyamide. In another exemplary embodiment, the first polymeric layer 102 may comprise two sub-layers. One sub-layer can comprise polysulfones and the other can comprise a polyamide. The polyamide layer generally contacts the bonding layer 104.

Polyamides are hydrophillic and form good supports for the bonding layer 104, which is also preferably hydrophillic. Exemplary polyamides comprise polypyrrolidone (nylon-4), polycaprolactam (nylon-6), polycapryllactam (nylon-8), polyhexamethylene adipamide (nylon-6,6), polyundecanolactam (nylon-11), polydodecanolactam (nylon-12), polyhexamethylene azelaiamide (nylon-6,9), polyhexamethylene sebacamide (nylon-6,10), polyhexamethylene isophthalamide (nylon-6,I), polyhexamethylene terephthalamide (nylon-6,T), polyamide of hexamethylene diamine and n-dodecanedioic acid (nylon-6,12), as well as polyamides resulting from terephthalic acid and/or isophthalic acid and trimethyl hexamethylene diamine, polyamides resulting from adipic acid and meta xylenediamines, polyamides resulting from adipic acid, azelaic acid and 2,2-bis-(p-aminocyclohexyl)propane, polyamides resulting from terephthalic acid and 4,4'-diamino-dicyclohexylmethane, or the like, or combinations comprising one at least one of the foregoing polyamides. Copolymers of the foregoing polyamides are also suitable for use in the first polymeric layer 102. Exemplary polyamide copolymers comprise copolymers of hexamethylene adipamide/caprolactam (nylon-6,6/6), copolymers of caproamide/undecamide (nylon-6/11), copolymers of caproamide/dodecamide (nylon-6/12), copolymers of hexamethylene adipamide/hexamethylene isophthalamide (nylon-6,6/6,1), copolymers of hexamethylene adipamide/hexamethylene terephthalamide (nylon-6,6/6,T), copolymers of hexamethylene adipamide/hexamethylene azelaiamide (nylon-6,6/6,9), or the like, or a combination comprising at least one of the foregoing polyamide copolymers.

In another exemplary embodiment, the first polymeric layer 102 may comprise polydopamine or an amine functionalized polymer. In another exemplary embodiment, the first polymeric layer 102 may comprise a blend of a non-amine containing organic polymer with polydopamine and/or an amine functionalized polymer. The non-amine containing organic polymer is preferably hydrophillic but not soluble in aqueous media. Examples of non-amine containing organic polymers that can be blended with the polydopamine or an amine functionalized polymer are polyvinyl alcohol and copolymer, polyamides (listed above) and copolymers, polyvinylpyrrolidone and copolymers, polyacrylic acid and copolymers, poly(meth)acrylates and copolymers, poly(2-oxazoline) and copolymers, polyethyleneimine and copolymers, polyalkylene oxides (e.g., polyethylene oxide, polypropylene oxide, or the like) and copolymers, or the like, or a combination thereof.

Copolymers of a non-amine containing organic polymer with polydopamine and/or an amine functionalized polymer may also be used in the first polymeric layer 102. The amine functionalized polymer can be a homopolymer or a copolymer.

Amine functionalized polymers include polymers functionalized with aromatic amines such as for example, molecules having the structure shown in formula (1) below:

(1)

where at least one of $R_1$ through $R_6$ is an amine functionalized $C_3$-$C_{10}$ alkyl chain, with the remainder being hydrogen, hydroxyl, $C_1$ to $C_{10}$ alkyl, or a combination thereof.

In one embodiment in the formula (1), $R_1$ is an amine functionalized $C_3$ alkyl chain and two or more of $R_2$ through $R_6$ are hydroxyl groups, with the remainder being hydrogen atoms. The amine functionalization can be at the end of the alkyl chain or a substituent (a pendant group) off of the alkyl chain backbone. An exemplary aromatic amine that may be used for functionalizing an otherwise non-amine containing organic polymer is dopamine (2-(3,4-dihydroxyphenyl)ethylamine). The functionalizing may be conducted along the chain backbone or at the chain end of the non-amine containing organic polymer.

In one embodiment, at least one of $R_1$ through $R_6$ is an amine functionalized $C_3$-$C_{10}$ alkyl chain where the alkyl chain is terminated with a carboxylate functionality with the remainder being hydrogen, hydroxyl, $C_1$ to $C_{10}$ alkyl, or a combination thereof. In another embodiment in the formula (1), $R_1$ is an amine functionalized $C_3$ alkyl chain where the alkyl chain is terminated with a carboxylate functionality (e.g., an ester group) and where two or more of $R_2$ through $R_6$ are hydroxyl groups, with the remainder being hydrogen atoms. Another exemplary aromatic amine that may be used for functionalizing an otherwise non-amine containing organic polymer is 3,4-dihydroxy-L-phenylalanine (L-DOPA), L-phenylanaline, or a combination thereof.

In another embodiment, the first polymeric layer 102 may comprise graphene, biomimetic membranes, other two-dimensional materials (such as molybdenum disulfide ($MoS_2$)), carbon nanotube membranes, or the like, or a combination thereof.

The graphene, biomimetic membranes, carbon nanotubes, and other two-dimensional materials may be compressed, woven, or bonded together to form a layer that can be used to provide support for the activation layer 106. The membranes manufactured from graphene, biomimetic membranes, carbon nanotubes, and other two-dimensional materials may be functionalized to support the activation layer 106. Catalase or Laccase enzymes may be grafted on these two-dimensional materials.

The first polymeric layer 102 may have a thickness 0.05 to 10 micrometers, preferably 0.1 to 7 micrometers, and more preferably 0.2 to 5 micrometers.

The bonding layer (e.g., the first and/or the second bonding layer) 104 is disposed on the first polymeric layer 102. It is desirable for the bonding layer to provide resistance to foulants by increasing surface hydrophilicity and by enabling further surface functionalization. The bonding layer (e.g., the first and/or the second bonding layer) 104 is also capable of bonding with the first polymeric layer 102 and of withstanding the hydrostatic pressure that the membrane is subjected to during water purification.

Examples of materials that are used in the bonding layer 104 are polydopamine, amine functionalized polymers listed above in formula (1) and the associated description, carboxylic acid functionalized polymers and copolymers, or the like, or a combination thereof.

Carboxylic acid functionalized polymers include carboxylated olefin copolymers that are not neutralized. In other words, the acid functionality in the carboxylated olefin copolymer is not neutralized with a metal ion. The carboxylated olefin copolymer comprises an ethylene or propylene polymer that has grafted thereto an unsaturated carboxylic acid or an anhydride, ester, amide, or imide, hereafter designated as "grafting compound". The grafting compound preferably is an aliphatic unsaturated dicarboxylic add or an anhydride. The carboxylic acid preferably contains up to 6, more preferably up to 5 carbon atoms. Examples of unsaturated carboxylic acids are maleic acid, fumaric acid, itaconic add, acrylic acid, methacrylic acid, crotonic acid, and citraconic acid. Examples of derivatives of unsaturated carboxylic acids are maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, monomaleamide, dimaleamide, N,N-diethylmaleamide, N-monobutylmaleamide, N,N-dibutylmaleamide, monofumaramide, difumaramide, N-monoethylfumaramide, N,N-diethylfumaramide, N-monobutylfumaramide, N,N-dibutylfumaramide, maleimide, N-butylmaleimide, N-phenylmaleimide, sodium acrylate, sodium methacrylate, potassium acrylate, and potassium methacrylate.

Examples of carboxylated olefin copolymers include ethylene/(meth)acrylic acid copolymers, ethylene/(meth) acrylic acid/n-butyl(meth)acrylate copolymers, ethylene/ (meth)acrylic acid/iso-butyl(meth)acrylate copolymers, ethylene/(meth)acrylic acid/tert-butyl(meth)acrylate copolymers, ethylene/(meth)acrylic acid/methyl(meth)acrylate copolymers, ethylene/(meth)acrylic acid/ethyl(meth)acrylate copolymers, ethylene/maleic acid and ethylene/maleic acid monoester copolymers, ethylene/maleic acid monoester/n-butyl(meth)acrylate copolymers, ethylene/maleic acid monoester/methyl(meth)acrylate copolymers, ethylene/maleic acid monoester/ethyl(meth)acrylate copolymers, or combinations of two or more thereof.

One or more, preferably one, grafting compound is grafted onto the ethylene or propylene polymer. Maleic anhydride is the preferred grafting compound. An exemplary unsaturated carboxylic acid is acrylic acid or methacrylic acid.

An exemplary bonding layer 104 comprises polydopamine. The bonding layer 104 may have a thickness of 0.01 to 3 micrometers, preferably 0.1 to 2 micrometers, and more preferably 0.2 to 1 micrometer.

Disposed on the bonding layer 104 is an activation layer that comprises catalytic nanoparticles that facilitate the conversion of impurities present in the water to a gas with or without addition of an additional chemical in the feed stream. The gas is released in the form of bubbles that facilitate the removal of impurities or prevent in the first place their deposition on the membrane 100. The catalyst or enzyme particles in the activation layer may be directly bonded to the bonding layer, may be bonded to nanoparticle substrates that are in turn bonded to the bonding layer, or are both directly bonded to the bonding layer and are bonded to nanoparticle substrates that are in turn bonded to the bonding layer.

The catalyst nanoparticles and the nanoparticle substrates have average particle sizes of 10 to 200 nanometers, preferably 20 to 150 nanometers, and more preferably 30 to 100 nanometers. The particle size is determined by the radius of gyration of the catalyst nanoparticles or the radius of gyration of the nanoparticle substrates. The nanoparticles may be one-dimensional, two-dimensional, or three dimensional structures, or combinations thereof and can have any particular shape including being rods, whiskers, platelets, spheres, cubes, cuboids, ellipsoids, tubes, or a combination thereof.

The nanoparticles are operative to convert chemical impurities (present naturally in the water naturally or manually added to the water) to gas bubbles. The gases released from decomposition of these impurities are generally non-toxic to life and function to disperse other impurities that collect on the membrane thus permitting the process to operate at lower pressures and at a greater efficiency than equivalent processes where gas bubbles are not produced. The released gases include oxygen, nitrogen, carbon dioxide, hydrogen, helium, or a combination thereof. The gases are released in the form of bubbles. In an exemplary embodiment, the released gas includes oxygen.

The gases bubbles are released at the rate of 0.00001 to 1000 cubic centimeter (cc)/minute. In another embodiment, the gas bubbles are released at the rate of 0.000001 to 10 cc/square centimeter of surface area of the membrane.

In an embodiment, the catalytic nanoparticles may comprise enzymes, metals, non-metals, or combinations thereof that are operative to facilitate the conversion of naturally present or added impurities in the water to a gas. The metals can include transition metals such as iron, copper, cobalt, nickel, ruthenium, rhodium, palladium, osmium, iridium, platinum, or the like, or a combination thereof. It could also include enzymes that can create gas such as catalases, laccases, or a combination thereof. Metal oxides can include iron oxide (FeO, $Fe_2O_3$, $Fe_3O_4$, or a combination thereof), copper oxide ($Cu_2O$, CuO, $CuO_2$, $Cu_2O_3$, or a combination thereof), titanium dioxide, aluminum oxide, zirconium oxide, manganese oxides ($MnO_2$) or the like, or a combination thereof. In an embodiment, the metal catalytic particles may be supported on metal oxide particles. An exemplary catalytic nanoparticle is copper oxide.

In another embodiment, the metal catalytic nanoparticles and/or the metal oxide catalytic nanoparticles may be supported on other nanoparticle substrates. The substrates may include carbonaceous substrates such as carbon nanotubes (single wall carbon nanotubes, double wall carbon nanotubes and/or multiwall carbon nanotubes), carbon black particles, graphite, graphene platelets, metal oxides (e.g., silicon dioxide, titanium dioxide, aluminum oxide, cerium oxide, zirconium dioxide, or the like, or a combination thereof). An exemplary substrate is a carbon nanotube.

In an embodiment, the activation layer 106 (that contains the catalytic nanoparticles) may cover the entire surface of the bonding layer 104. In another embodiment, the activation layer 106 may only partially cover the surface of the bonding layer 104. The activation layer 106 may cover an amount of greater than 10%, preferably greater than 20%, preferably greater than 30% upto a maximum amount of 90% of the surface area of the bonding layer 104.

The catalytic nanoparticles are generally present on the bonding layer 104 in an amount of 1 part per million (ppm) to 100 ppm, preferably 50 to 90 ppm, and more preferably 60 to 80 ppm, based on the weight of the bonding layer 104.

Impurities in water that can lead to the formation of gas bubbles include peroxides, superoxides, dioxygenyls, ozones and ozonides. Exemplary impurities are peroxides. Peroxides may be organic and inorganic peroxides. Inorganic peroxides are divided into ionic and covalent peroxides. The ionic peroxides mostly contain the peroxides of the alkali and alkaline earth metals whereas the covalent peroxides are represented by such compounds as hydrogen peroxide and peroxymonosulfuric acid ($H_2SO_5$). In contrast to the purely ionic character of alkali metal peroxides, peroxides of transition metals have a more covalent character. Organic peroxides can be divided into two major classes, peroxy acids and organic hydroperoxides. The first class is derived from the carboxylic acid and the second from ethers or alcohols. Inorganic peroxides and/or organic peroxides can be added to water to facilitate its purification. Peroxides have a bleaching effect on organic substances and therefore are added to water to facilitate in its purification.

Peroxides decompose upon contact with the catalytic particles to produce oxygen bubbles that facilitate the dispersion of impurities that collect on the surface of the membrane. The oxygen-oxygen chemical bond of peroxide is unstable and easily split into reactive radicals via homolytic cleavage. Exemplary peroxides are hydrogen peroxide.

When copper oxide (CuO) is used as the catalyst nanoparticle and when hydrogen peroxide that is added to water to aid in its purification, the hydrogen peroxide is decomposed by the catalyst nanoparticles to form oxygen bubbles that facilitate the removal of impurities that agglomerate on the membrane. As noted above, other additives that can decompose to release nitrogen, carbon dioxide, hydrogen, helium, argon, or the like, or a combination thereof may be added to the water to facilitate in the removal of impurities that agglomerate on the membrane.

In one embodiment, in one method of manufacturing the membrane 100, the first polymeric layer 102 is bonded to the bonding layer 104. The activation layer 106 that contains the catalytic particles is then disposed on the bonding layer 104.

When the membrane 100 comprises a first bonding layer 104A and a second bonding layer 104B, the two bonding layers can first be disposed onto the first polymeric layer 102. The first activation layer 106A and the second activation layer 106B may then be disposed onto the first bonding layer 104A and the second bonding layer 106B respectively as seen in the FIG. 2.

The multilayered membranes of the FIGS. 1 and 2 may be produced by co-extrusion, lamination, adhesion, or the like, or a combination thereof. In an embodiment, the activation layer may be applied to the bonding layer via spray painting, spin casting, dip coating, painting, doctor-blading, or the like.

In one method of using the membrane 100, it is disposed in a purification vessel 200 with the activation layer 106 disposed on the concentrate side of the membrane 100. This is depicted in the FIG. 3. When the water (to which a peroxide is added) on the concentrate side contacts the activation layer 106, the hydrogen peroxide decomposes to release oxygen bubbles, which disturb any sludge formed on the concentrate side of the membrane 100. The continual release of such gas bubbles prevents the formation of any further foulant layer on the concentrate side of the membrane. The micro-mixing produced also reduces the concentration polarization which reduces the amount of pressure on the concentrate side of the membrane and results in a reduction of the amount of energy consumed in the process of water purification.

Figure 3:
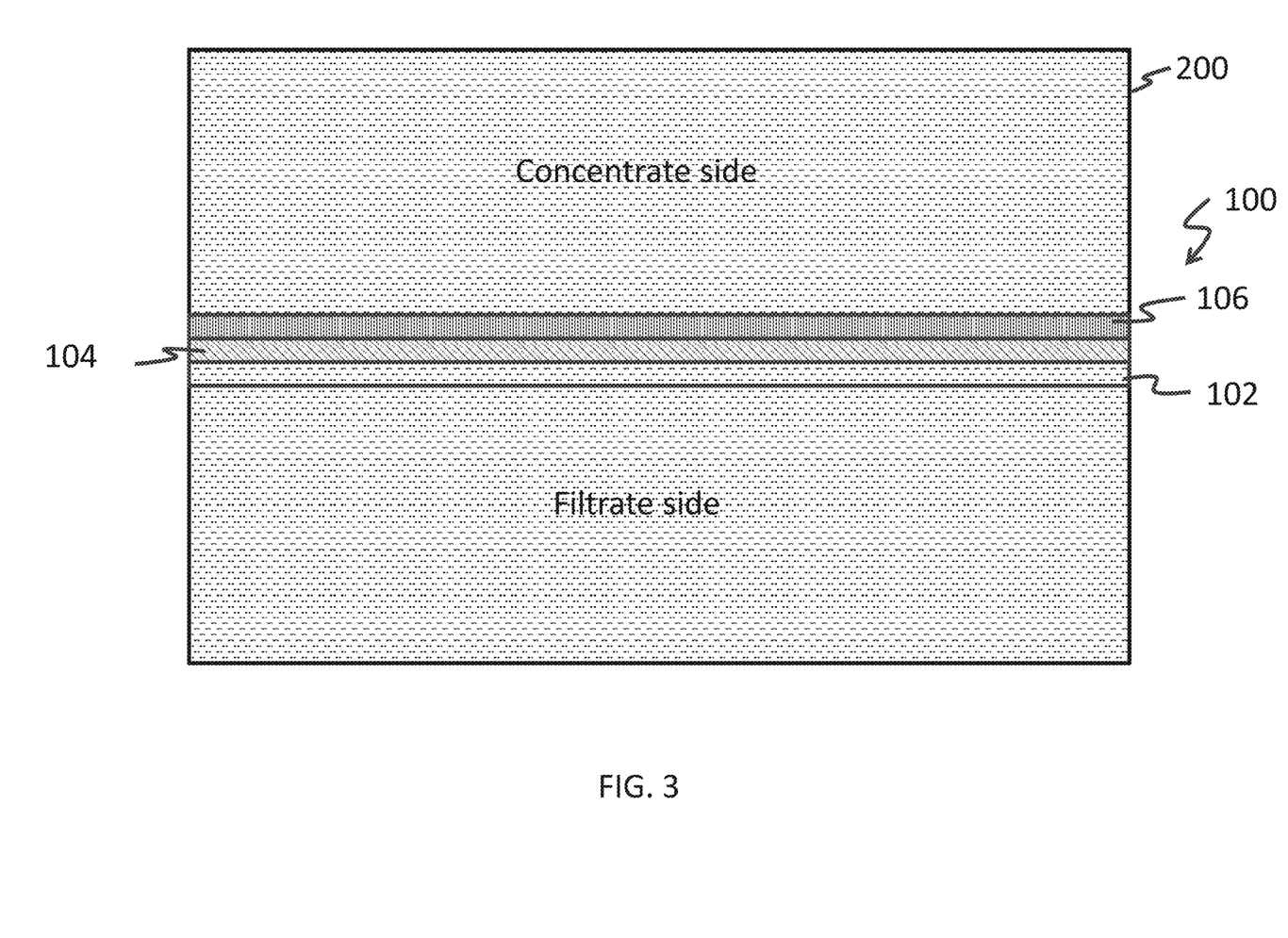
FIG. 3 is a schematic depiction of an exemplary membrane used in water purification system.

While the membrane 100 depicted in the FIG. 3 is the membrane depicted in the FIG. 1, it is also possible to use the membrane depicted in the FIG. 2 in the purification vessel 200. If the membrane 100 of the FIG. 2 (having activation layers on opposing surfaces of the membrane) is used, then both activation layer 106 can be used to facilitate purification of the membrane.

The membrane disclosed herein and the method of using this membrane is advantageous because it facilitates a reduction in amount of energy used in water purification. The generation of gas bubbles prevents concentration polarization, which reduces the amount of sludge retained on the membrane as a result of water purification. The membranes can be used in both nanofiltration (NF) processes and is reverse osmosis (RO) processes.

The membrane along with the method of using the membrane is detailed in the following non-limiting example.

EXAMPLE

This example was conducted to demonstrate the use of a membrane that comprises a bonding layer that comprises dopamine upon which is disposed an activation layer that comprises copper oxide (cupric oxide) CuO nanoparticles.

Flat sheet sea water reverse osmosis (RO) membranes (DOW SW30HR) and nanofiltration membranes (NF90) obtained from Dow Water and Process Solutions (DWPS), were used for colloidal/organic fouling and biofouling experiments, respectively.

Figures 4A, 4B, 4C, 4D, 4E:
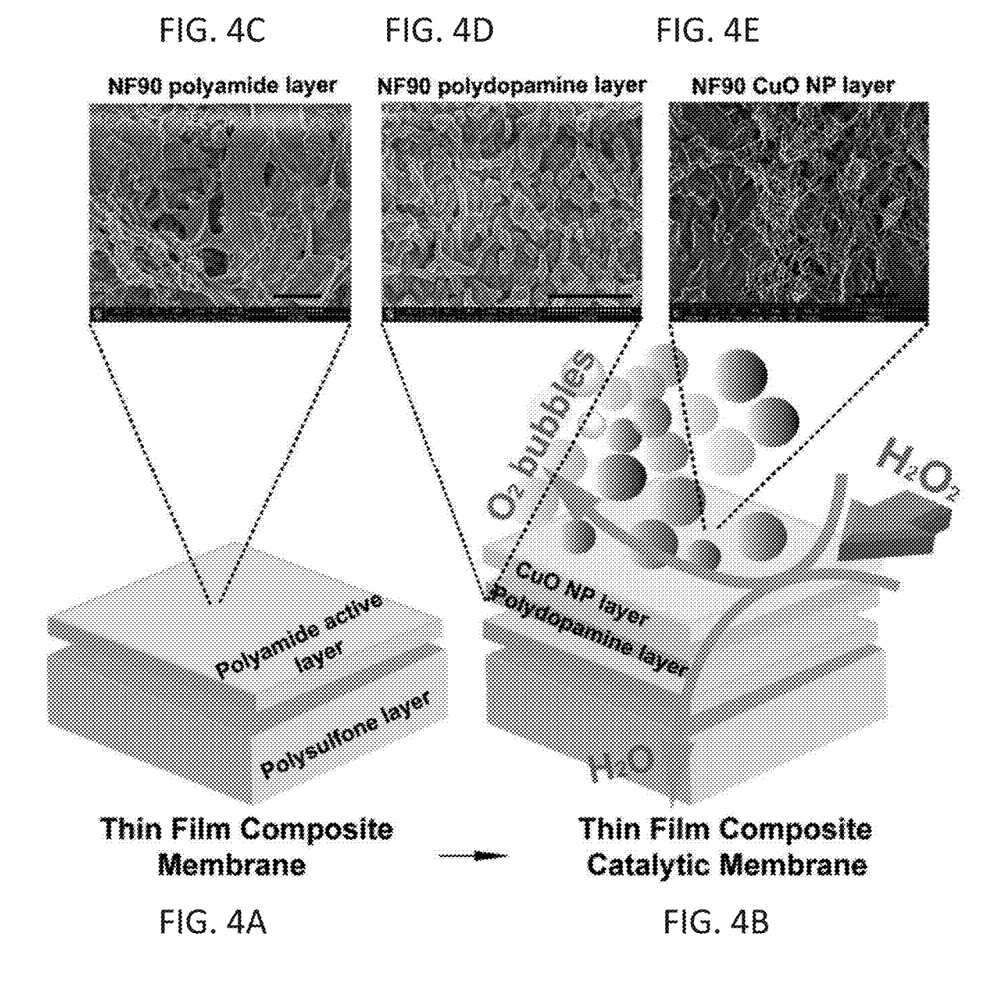
FIG. 4A depicts a membrane that comprises a polysulfone layer and a polyamide layer both of which act together to constitute the first polymeric layer. The membrane in the FIG. 4A does not have a polydopamine layer.
FIG. 4B depicts a membrane that comprises a polydopamine bonding layer that is disposed on the polyamide layer of the FIG. 4A. An activated layer of CuO nanoparticles is disposed on the polydopamine layer.
FIG. 4C is a scanning electron microscope photomicrograph of the polyamide surface.
FIG. 4D is a scanning electron microscope photomicrograph of the polydopamine surface.
FIG. 4E is a scanning electron microscope photomicrograph of CuO nanoparticles disposed on the polydopamine surface.

The dopamine bonding layer 104 was prepared using dopamine hydrochloride as follows. Dopamine hydrochloride (Sigma) was polymerized in 10 mM Tris-HCl buffer maintained at pH ~8.5 and coated on respective thin film composite membranes under continuous rocking (details in Supplementary information). CuO nanoparticles were prepared using drop-by-drop addition of NaOH in Cu $(NO3)_2.2H_2O$ (Strem Chemicals) precursor solution in ultra-pure water (Barnstead Nanopure, Model 7146, 18.2 MΩ-cm) (Supplementary information). The membranes were represented as 8 ppm CuO/PDA or 80 ppm CuO/PDA according to the precursor concentrations. A schematic of the surface active catalytic membrane with added polydopamine and metal oxide layers is shown in the FIG. 4. FIG. 4A depicts a membrane that comprises a polysulfone layer and a polyamide layer both of which act together to constitute the first polymeric layer 102. The membrane in the FIG. 4A does not have a polydopamine layer. FIG. 4B depicts a membrane that comprises a polydopamine bonding layer that is disposed on the polyamide layer of the FIG. 4A. An activated layer of CuO nanoparticles is disposed on the polydopamine layer. FIG. 4C is a scanning electron microscope photomicrograph of the polyamide surface, while FIG. 4D is a scanning electron microscope photomicrograph of the polydopamine surface. The FIG. 4E is a scanning electron microscope photomicrograph of CuO nanoparticles disposed on the polydopamine surface.

CuO nanoparticles were characterized using X-Ray Diffraction (XRD) with 2θ range of 5-70° at Cu-Kα wavelength of 1.54 Å. All the highlighted peaks can be indexed to crystalline tenorite phase of CuO. $MnO_2$ nanoparticles were also synthesized and loaded on RO membranes using a drop-by-drop method.

The membranes were characterized using scanning electron microscopy (SEM) (FEI Helios NanoLab 660 and FEI NanoSEM 630) for surface morphology and catalytic properties were analyzed using a batch reaction-methylene blue decolorization. For a given copper oxide/polydopamine membrane, three independent 1 centimeter (cm)×2 cm randomly cut pieces were used to degrade methylene blue (12 mg/L) with 3% hydrogen peroxide ($H_2O_2$) (Fisher Scientific) in a 5 milliliter (ml) solution volume. Absorbance was measured at different time points using UV-VIS spectrophotometer (Thermo Scientific Evolution 201) at 667 nanometer (nm) wavelength.

A first order reaction kinetics rate equation was fit to this data to get the reaction rate constant (k) and thereby, catalytic activity of the membrane. The catalytic activity of $MnO_2$/PDA membranes were found to be weaker than CuO/PDA membranes as seen in the methylene blue decolorization test. The reaction rate constant (k) of the 8 ppm $MnO_2$/PDA membrane was found to be around 45% less than the 8 ppm CuO/PDA membrane.

Colloidal silica particles of 80 nm mean diameter, Snowtex-ZL supplied by Nissan Chemical America Corp. (Houston, Tex.) and Humic acid from Aldrich (St. Louis, Mo.) were used in colloidal and organic fouling experiments. NaCl was purchased from Sigma-Aldrich and 20 mM NaCl concentration was used throughout all experiments.

A constant pressure bench scale cross flow reverse osmosis system equipped with a SEPA CF membrane cell of 138 $cm^2$ filtration area (Sterlitech Corp., Kent, Wash.) was used for colloidal and organic fouling experiments. The CuO/PDA RO membranes were compacted for 24 hours in DI water and then conditioned with 20 mM NaCl for a further 12 hours before charging foulants (0.017% silica nanoparticles for colloidal fouling and 50 ppm humic acid (HA) for organic fouling). The fouling (4 liter (L) feed volume) was further continued for another 24 to 48 hours before a 60 to 240 ppm $H_2O_2$ pulse addition into the feed tank. Concentration polarization experiments with 80 ppm CuO/PDA membranes were performed with measuring the flux for 2 to 6 hours at different NaCl feed concentrations (0-250 mM range) and 240 ppm $H_2O_2$ injection at each NaCl concentration.

Biofouling experiments were performed in an Advantec MFS UHP-76 (Dublin, Calif., USA) stirred cell with effective membrane area of 35.3 $cm^2$. Wild type red fluorescent protein (rfp) incorporated E. coli (E. coli TG1/pBdcAE50Q-rfp-lasR) was used as a model organism for biofilm development. Such biofilms were developed on NF90 membranes over a 24 hour time period using M9-0.4% glucose (M9G) medium with Chloramphenicol (Cm, 300 μg/ml) antibiotic for sustaining rfp plasmids. A laser scanning confocal microscope TCS SP5 (Leica Microsystem, Wetzlar, Germany)

equipped with 63×/1.4 oil objective lens, 488/514 nm double dichoric lens and 550 nm-650 nm wavelength were used to visualize the biofilms.

A robust flux decline reversal was observed during real time operation of a bench-scale RO system with the catalytic membrane with addition of $H_2O_2$. This effect was observed with both silica colloids as well as humic acids as foulants. With 18 liters per meters squared per hour (LMH) initial flux, 0.017% silica nanoparticles decreased the normalized flux by 9% in 1300 minutes.

Figures 5A, 5C:
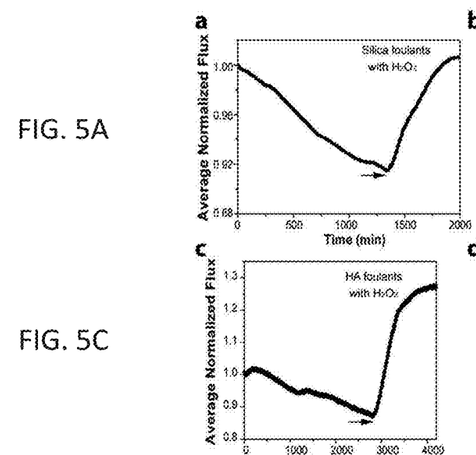
FIG. 5A is a graph that shows flux decline with 0.017% silica nanoparticles and 8 ppm CuO/PDA RO membrane at ~18 LMH at 292K and subsequent flux recovery upon 240 ppm $H_2O_2$ addition.
FIG. 5C is a graph that shows flux decline with 50 ppm HA and 8 ppm CuO/PDA RO membrane at ~18 LMH at 292K and subsequent flux recovery upon 240 ppm $H_2O_2$ addition. The recovered flux exceeded prefouling flux.

The addition of 240 ppm $H_2O_2$ thereafter, increased the flux value to the original prefouling level within 2000 minutes of operation (See FIG. 5A, which is a graph that depicts the average normalized flux with time). FIG. 5A shows a flux decline with 0.017% silica nanoparticles and 8 ppm CuO/PDA RO membrane at ~18 LMH at 292K and subsequent flux recovery upon 240 ppm $H_2O_2$ addition.

Figures 5B, 5D:
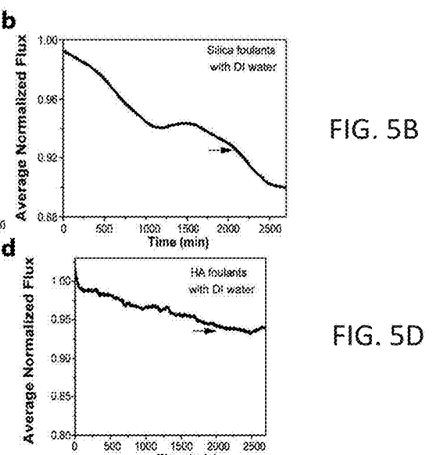
FIG. 5B is a graph that shows flux decline with 0.017% silica nanoparticles with virgin RO membrane at ~18 LMH at 292K and subsequent flux decline without recovery upon same volume DI water addition as $H_2O_2$.
FIG. 5D is a graph that shows flux decline with 50 ppm HA with virgin RO membrane at ~18 LMH at 292K and subsequent flux decline without recovery upon same volume DI water addition as $H_2O_2$.

The average normalized flux decline rate was 0.0035±0.0013 $h^{-1}$ and average flux recovery rate was 0.011±0.005 $h^{-1}$ for colloidal silica foulants. Therefore, the flux recovery ratio was almost 3 times of the flux decline ratio. The control experiment, performed with unmodified SW30HR membrane, showed a negligible effect of $H_2O_2$ addition on flux improvement (See FIG. 5B, which is a graph that depicts the average normalized flux with time). FIG. 5B depicts a flux decline with 0.017% silica nanoparticles with virgin RO membrane at ~18 LMH at 292K and subsequent flux decline without recovery upon 240 ppm $H_2O_2$ addition.

Humic acid foulants also decreased the flux, however, at a slower rate than silica nanoparticles (See FIG. 5C, which is a graph that depicts the average normalized flux with time) on the polydopamine modified membrane. The FIG. 5C depicts a flux decline with 50 ppm HA and 8 ppm CuO/PDA RO membrane at ~18 LMH at 292K and subsequent flux recovery upon 240 ppm $H_2O_2$ addition. The recovered flux exceeded the prefouling flux.

This might be primarily because of polydopamine coating induced steric repulsion and not due to higher zeta potential of the former organic foulant. In the control case, the virgin membrane was rapidly fouled by the same concentration of HA (See FIG. 5D, which is a graph that depicts the average normalized flux with time). The FIG. 5D shows the flux decline with 50 ppm HA with virgin RO membrane at ~18 LMH at 292K and subsequent flux recovery upon 240 ppm $H_2O_2$ addition.

Figure 5E:
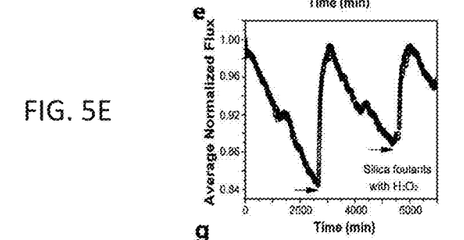
FIG. 5E is a graph that shows repeated flux decline and recovery with 0.017% silica nanoparticles under similar conditions.
Figure 5F:
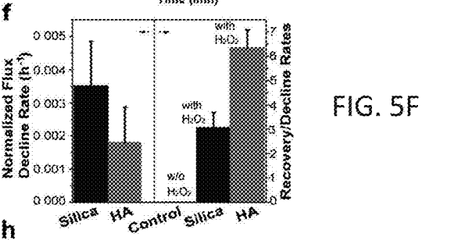
FIG. 5F is a bar graph that shows normalized average flux decline rates for silica and HA foulants on the left y-axis and recovery to decline rate ratios for both silica and HA foulants along with control (with $H_2O_2$ addition) on the right y-axis. Flux recovery rates for HA is almost twice than silica nanoparticles.

Due to degradation of HA and concomitant micro-mixing near the membrane after $H_2O_2$ addition, the flux recovered back in the control case with unmodified membrane. However, the increase in flux with virgin membrane was less than the catalytic membrane case, where the normalized flux increase was beyond 1.0 and sustained for more than 24 hours. The FIG. 5E is a graph that depicts the repeated flux decline and recovery with 0.017% silica nanoparticles under similar conditions. The FIG. 5F is a bar graph that depicts a normalized average flux decline rates for silica and HA foulants on the left y-axis and recovery to decline rates' ratios for both silica and HA foulants on the right y-axis. The flux recovery rate for humic acid is almost twice that of the silica nanoparticles.

The average flux decline rate for HA foulants was 0.0018±0.0010 $h^{-1}$ and average flux recovery rate was 0.014±0.005 $h^{-1}$ for the same foulants with the catalytic membrane. Therefore, the flux recovery rate for HA was more than 6 times faster than the decline rate and the flux recovery rate was 30% higher than silica case. This might be attributed to the catalytic effects of HA. HA was demonstrated to act as electron shuttles accelerating $H_2O_2$ decomposition, OH• radical generation and low molecular weight acids production, which might impart cleaning action on membrane surface through local pH changes, reaction induced micro-mixing and reverse diffusion phoresis.

Figure 5G:
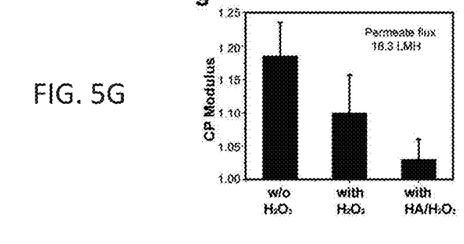
FIG. 5G is a bar graph that shows sequential reduction in concentration polarization upon using only 240 ppm $H_2O_2$ and 240 ppm $H_2O_2$ along with 10 ppm HA at ~18 LMH and 292K.
Figure 5H:
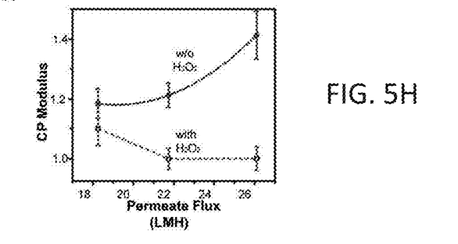
FIG. 5H shows increase in concentration polarization (CP) modulus with subsequent increase in permeate flux without $H_2O_2$ addition and complete mitigation of CP modulus at higher fluxes with 240 ppm $H_2O_2$ addition at 292K.

FIG. 5G is a bar graph that shows sequential reduction in concentration polarization upon using only 240 ppm $H_2O_2$ and 240 ppm $H_2O_2$ along with 10 ppm HA at ~18 LMH and 292K. FIG. 5H shows increase in concentration polarization (CP) modulus with subsequent increase in permeate flux without $H_2O_2$ addition and complete mitigation of CP modulus at higher fluxes with 240 ppm $H_2O_2$ addition at 292K.

The CuO/PDA membranes were effective to reduce concentration polarization modulus upon addition of $H_2O_2$. This reduction effect was attenuated at lower fluxes (e.g., 18.3 LMH) due to lower mass transfer co-efficient which was enhanced at higher fluxes (e.g., 26.1 LMH) due to increased mass transfer co-efficients driven by the bubble generation reaction.

In summary, two different CuO nanorod loadings on NF90 membrane were tested. Bulk CuO loadings of 8 and 80 ppm were applied on the PDA coated membrane. Since, leached copper-peptide complex induced reactive oxygen species (ROS) eventually damages the cell, higher loading of CuO (80 ppm) was found to be more effective in keeping bacterial attachment and biofilm formation in control.

The disclosed membrane and method is advantageous in that it facilitates the generation of cleaning microbubbles at the membrane surface that also enhances mass transfer and reduces concentration polarization significantly when implemented. It permits the modification of a commercial RO membrane surface with a bioinspired adhesive polymer, polydopamine, and then catalytic metal oxide nanoparticles (CuO) are anchored to its surface.

This modified membrane can catalyze the degradation of $H_2O_2$, pulse-injected into the water feed solution at a low concentrations (of the order of 0.006%-0.024 wt %). The oxygen molecules and hydroxyl radicals, thus generated, degrade organic matter and efficiently prevent particulate deposition through bubble generated physical repulsion.

The burst of oxygen bubbles transports deposited particulate matter away from the concentration boundary layer and completely reverses the fouling effect from particles. Surprisingly, catalytic bubble formation, in conjunction with humic acid particles, leads to a complete mitigation of concentration polarization and a flux increase over initial flux due to the higher activity of chelated humic acid.

Immobilized metal oxide nanoparticles also hinder biofilm formation on the membrane surface with and without peroxide addition. This simple, scalable in situ approach of membrane fouling mitigation in which the purification operation does not need to be interrupted, can be used to handle a large majority of common membrane foulants simultaneously. Used periodically at an optimized dosing concentration, it can mitigate permeate flux decline and provide a way to interrupt concentration polarization layer formation.

It is to be noted that all ranges detailed herein include the endpoints. Numerical values from different ranges are combinable.

The term "and/or" includes both "and" as well as "or". For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A membrane comprising:
   a bonding layer; and
   an activation layer disposed on the bonding layer and in contact with it; where the activation layer comprises catalyst nanoparticles that are operative to decompose impurities contained in an aqueous solution to generate gas bubbles and reactive oxygen species that remove or prevent the formation of a foulant layer disposed on the membrane; where the catalyst nanoparticles comprise metal nanoparticles or metal oxide nanoparticles; wherein the metal nanoparticles comprise cobalt, nickel, ruthenium, rhodium, osmium, iridium, platinum, or a combination thereof; and wherein the metal oxide nanoparticles comprise FeO, $Fe_2O_3$, $Fe_3O_4$, or a combination thereof; $Cu_2O$, CuO, $CuO_2$, $Cu_2O_3$, or a combination thereof; $MnO_2$; or a combination thereof; wherein the catalytic nanoparticles are present on the bonding layer in an amount of 1 part per million (ppm) to 150 ppm, based on the weight of the bonding layer.

2. The membrane of claim 1, where the membrane further comprises a first polymeric layer that contacts a surface of the bonding layer that is opposed to a surface that contacts the activation layer.

3. The membrane of claim 2, where the first polymeric layer comprises a polyamide and/or a polysulfone.

4. The membrane of claim 1, where the bonding layer comprises a polydopamine.

5. The membrane of claim 1, where the bonding layer comprises an amine functionalized polymer or an amine functionalized copolymer.

6. The membrane of claim 5, where the amine functionalized polymer or the amine functionalized copolymer comprises a polymer functionalized with an aromatic amine having the structure shown in formula (1) below:

where at least one of $R_1$ through $R_6$ is an amine functionalized $C_3$-$C_{10}$ alkyl chain, with the remainder being hydrogen, hydroxyl, $C_1$ to $C_{10}$ alkyl, or a combination thereof; or where at least one of $R_1$ through $R_6$ is an amine functionalized $C_3$-$C_{10}$ alkyl chain where the alkyl chain is terminated with a carboxylate functionality with the remainder being hydrogen, hydroxyl, $C_1$ to $C_{10}$ alkyl, or a combination thereof.

7. The membrane of claim 6, where the aromatic amine is 2-(3,4-dihydroxyphenyl)ethylamine, 3,4-dihydroxy-L-phenylalanine, L-phenylanaline, or a combination thereof.

8. The membrane of claim 1, where the catalyst nanoparticles are operative to decompose a peroxide present in the aqueous solution.

9. The membrane of claim 2, where the first polymeric layer further comprises graphene, biomimetic membranes, two-dimensional molybdenum disulfide, carbon nanotube membranes, or a combination thereof.

10. The membrane of claim 1, where the activation layer occupies 10 to 90 percent of the surface of the bonding layer.

11. An article comprising the membrane of claim 1.

12. The article of claim 11, where the article is used for water purification.

* * * * *